(12) United States Patent
Huang (10) Patent No.: US 11,740,639 B2
(45) Date of Patent: Aug. 29, 2023

(54) METHOD AND APPARATUS FOR GUTTING SIGNAL LIGHT INFORMATION

(71) Applicant: Apollo Intelligent Connectivity (Beijing) Technology Co., Ltd., Beijing (CN)

(72) Inventor: Qing Huang, Shenzhen (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 41 days.

(21) Appl. No.: 17/507,639

(22) Filed: Oct. 21, 2021

(65) Prior Publication Data

US 2022/0180743 A1 Jun. 9, 2022

(30) Foreign Application Priority Data

Dec. 3, 2020 (CN) .......................... 202011393947.5

(51) Int. Cl.
*G08G 1/07* (2006.01)
*G08G 1/095* (2006.01)
(Continued)

(52) U.S. Cl.
CPC ......... *G05D 1/0276* (2013.01); *G05D 1/0221* (2013.01); *G08G 1/07* (2013.01);
(Continued)

(58) Field of Classification Search
CPC ...... G05D 1/0276; G05D 1/0221; G08G 1/07; G08G 1/093; G08G 1/095; G08G 1/096708
See application file for complete search history.

(56) References Cited

U.S. PATENT DOCUMENTS 6,850,171 B2 * 2/2005 Mathias ................... G08G 1/08
701/119
9,633,560 B1 * 4/2017 Gao ......................... G08G 1/07
(Continued)

FOREIGN PATENT DOCUMENTS

CN 107449435 A 12/2017
CN 109243191 A 1/2019
(Continued)

OTHER PUBLICATIONS

European Patent Application No. 21204251.9 extended European search report dated Apr. 5, 2022, 8 pages.

*Primary Examiner* — Sisay Yacob
(74) *Attorney, Agent, or Firm* — Cozen O'Connor (57) ABSTRACT

A method and an apparatus for outputting signal light information are provided. The method may include: acquiring guidance information and positioning information of a terminal, where the guidance information includes a turning information piece of a turning at a nearest intersection along a traveling direction of the terminal; acquiring information pieces of a signal light at the nearest intersection of the terminal; determining, in response to determining that the terminal satisfies a preset position condition based on the positioning information, from the signal light information pieces, a signal light information piece corresponding to the turning information piece in the guidance information, and using the signal light information piece as a target signal light information piece; and outputting the target signal light information piece.

18 Claims, 5 Drawing Sheets

(51) Int. Cl.
  *G08G 1/09* (2006.01)
  *G05D 1/02* (2020.01)
  *G08G 1/0967* (2006.01)

(52) U.S. Cl.
  CPC .......... *G08G 1/093* (2013.01); *G08G 1/095* (2013.01); *G08G 1/096708* (2013.01)

(56) References Cited

U.S. PATENT DOCUMENTS

| | | | |
|---|---|---|---|
| 10,210,755 B1* | 2/2019 | Franco | G08G 1/0112 |
| 10,354,523 B2* | 7/2019 | Jin | G08G 1/0133 |
| 11,151,870 B2* | 10/2021 | Xu | G08G 1/083 |
| 2018/0053414 A1 | 2/2018 | Qin et al. | |
| 2020/0160701 A1* | 5/2020 | Mobasser | G08G 1/0145 |
| 2020/0312140 A1* | 10/2020 | Kurehashi | G08G 1/083 |
| 2020/0410855 A1* | 12/2020 | Zalila-Wenkstern | G08G 1/083 |
| 2021/0142664 A1* | 5/2021 | Xu | G08G 1/08 |
| 2021/0195365 A1* | 6/2021 | Chen | G01C 21/28 |

FOREIGN PATENT DOCUMENTS

| | | |
|---|---|---|
| CN | 110211403 A | 9/2019 |
| CN | 111081044 A | 4/2020 |
| CN | 111179613 A | 5/2020 |
| CN | 111311936 A | 6/2020 |
| CN | 111369820 A | 7/2020 |
| CN | 111489544 A | 8/2020 |
| CN | 111554108 A | 8/2020 |
| CN | 111885500 A | 11/2020 |
| CN | 111899539 A | 11/2020 |
| CN | 111968376 A | 11/2020 |
| EP | 2093738 A2 | 8/2009 |
| EP | 2944532 A2 | 11/2015 |
| JP | 2005-147865 A | 6/2005 |
| JP | 2006-242888 A | 9/2006 |
| JP | 2006-285732 A | 10/2006 |
| JP | 2014112430 A | 6/2014 |
| KR | 20110045762 A | 5/2011 |
| KR | 20130126197 A | 11/2013 |
| KR | 20190061403 A | 6/2019 |
| WO | WO 2017070373 A1 | 4/2017 |

* cited by examiner

METHOD AND APPARATUS FOR GUTTING SIGNAL LIGHT INFORMATION

CROSS-REFERENCE TO RELATED APPLICATIONS

This application claims the priority of Chinese Patent Application No. 202011393947.5, titled "METHOD AND APPARATUS FOR OUTING SIGNAL LIGHT INFORMATION", filed on Dec. 3, 2020, the content of which is incorporated herein by reference in its entirety.

TECHNICAL FIELD

The present disclosure relates to the field of computer technology, specifically, to the technical field of artificial intelligence, further, to the technical fields of intelligent transportation and driving assistance, and in particular, to a method and apparatus for outputting signal light information.

BACKGROUND

With the development of intelligent transportation technology, navigation systems can show users a wealth of traffic information. For example, more and more terminals such as on-board systems or smart phones can show users traffic light information at intersections.

Traffic light information at intersections is often directed to multiple traveling directions. After terminals arrive at intersections, the terminals can acquire the information of traffic lights at the intersections and display the information to users at the terminals.

SUMMARY

A method and apparatus for outputting signal light information, an electronic device and a storage medium are provided.

According to a first aspect, a method for outputting signal light information is provided, and the method includes: acquiring guidance information and positioning information of a terminal, where the guidance information includes a turning information piece of a turning at a nearest intersection along a traveling direction of the terminal; acquiring information pieces of a signal light at the nearest intersection of the terminal, where the signal light information pieces include multiple signal light information pieces corresponding to multiple turning information pieces respectively; determining, in response to determining that the terminal satisfies a preset position condition based on the positioning information, from the multiple signal light information pieces, a signal light information piece corresponding to the turning information piece in the guidance information, and using the signal light information piece as a target signal light information piece; and outputting the target signal light information piece.

According to a second aspect, an apparatus for outputting signal light information is provided, and the apparatus includes: a first acquisition unit configured to acquire guidance information and positioning information of a terminal, where the guidance information includes a turning information piece of a turning at a nearest intersection along a traveling direction of the terminal; a second acquisition unit configured to acquire information pieces of a signal light at the nearest intersection of the terminal, where the information pieces of the signal light include multiple signal light information pieces corresponding to multiple turning information pieces respectively; a determination unit configured to determine, in response to determining that the terminal satisfies a preset position condition based on the positioning information, from the multiple signal light information pieces, a signal light information piece corresponding to the turning information piece in the guidance information, and use the signal light information piece as a target signal light information piece; and an output unit configured to outputting the target signal light information piece.

According to a third aspect, an electronic device is provided, and the electronic device includes: one or more processors; and a storage apparatus for storing one or more programs, where the one or more programs, when executed by the one or more processors, cause the one or more processors to implement the method as described in any one of the embodiments of the method for outputting signal light information.

According to a fourth aspect, a computer readable storage medium storing a computer program is provided, and the program, when executed by a processor, implements the method as described in any one of the embodiments of the method for outputting signal light information.

BRIEF DESCRIPTION OF THE DRAWINGS

By reading the detailed description of non-limiting embodiments with reference to the following accompanying drawings, other features, objects and advantages of the present disclosure will become more apparent.

DETAILED DESCRIPTION OF EMBODIMENTS

Example embodiments of the present disclosure are described below in combination with the accompanying drawings, where various details of the embodiments of the present disclosure are included to facilitate understanding and should be considered as examples only. Therefore, those of ordinary skill in the art should realize that various changes and modifications may be made to the embodiments described herein without departing from the scope and spirit of the present disclosure. Similarly, for clarity and conciseness, descriptions of well-know functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
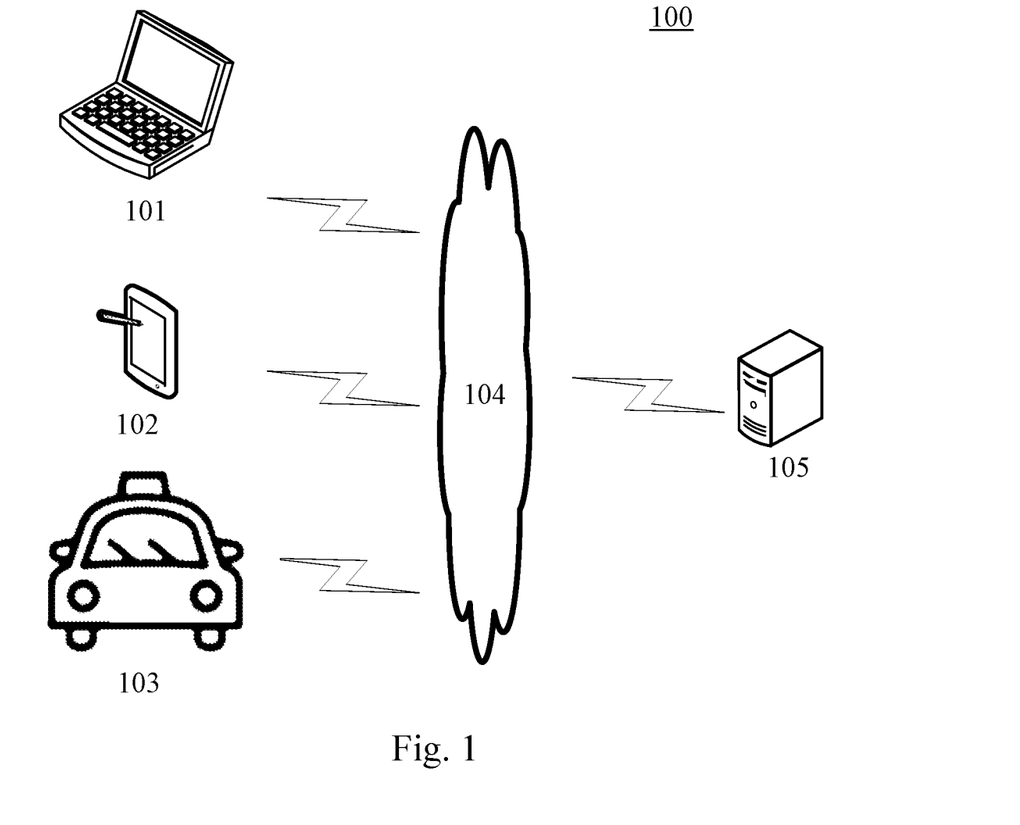
FIG. 1 is an example system architecture to which some embodiments of the present disclosure may be applied.

FIG. 1 shows an example system architecture 100 to which an embodiment of a method or apparatus for outputting signal light information according to the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

A user may use the terminal devices 101, 102, 103 to interact with the server 105 through the network 104 to receive or send messages. Various communication client applications, such as navigation applications, video applications, live broadcast applications, instant messaging tools, mailbox clients and social platform software, may be installed on the terminal devices 101, 102, 103.

The terminal devices 101, 102, 103 may be hardware or software. When the terminal devices 101, 102, 103 are hardware, the terminal devices 101, 102, 103 may be various electronic devices having a display screen, including but not limited to a vehicle (such as an on-board brain), a smart phone, a tablet computer, an electronic book reader, a laptop portable computer and a desktop computer; and when the terminal devices 101, 102, 103 are software, the terminal devices 101, 102, 103 may be installed in the electronic devices, and may be implemented as multiple software pieces or software modules (such as, multiple software pieces of software modules for providing distributed services), or as a single software piece or software module, which is not specifically limited herein.

The server 105 may be a server providing various services, such as a background server providing support for the terminal devices 101, 102, 103. The background server may perform processing, such as analysis on a received data, such as a preset position condition, and feed back a processing result (such as a fence range) to the terminal devices.

It should be noted that the method for outputting signal light information provided by the embodiments of the present disclosure is generally executed by the server 105 or the terminal devices 101, 102, 103. Correspondingly, the apparatus for outputting signal light information is also generally arranged in the server 105 or the terminal devices 101, 102, 103.

It should be appreciated that the number of the terminal devices, the network and the server in FIG. 1 is merely illustrative. Any number of terminal devices, networks and servers may be provided according to actual requirements.

Figure 2:
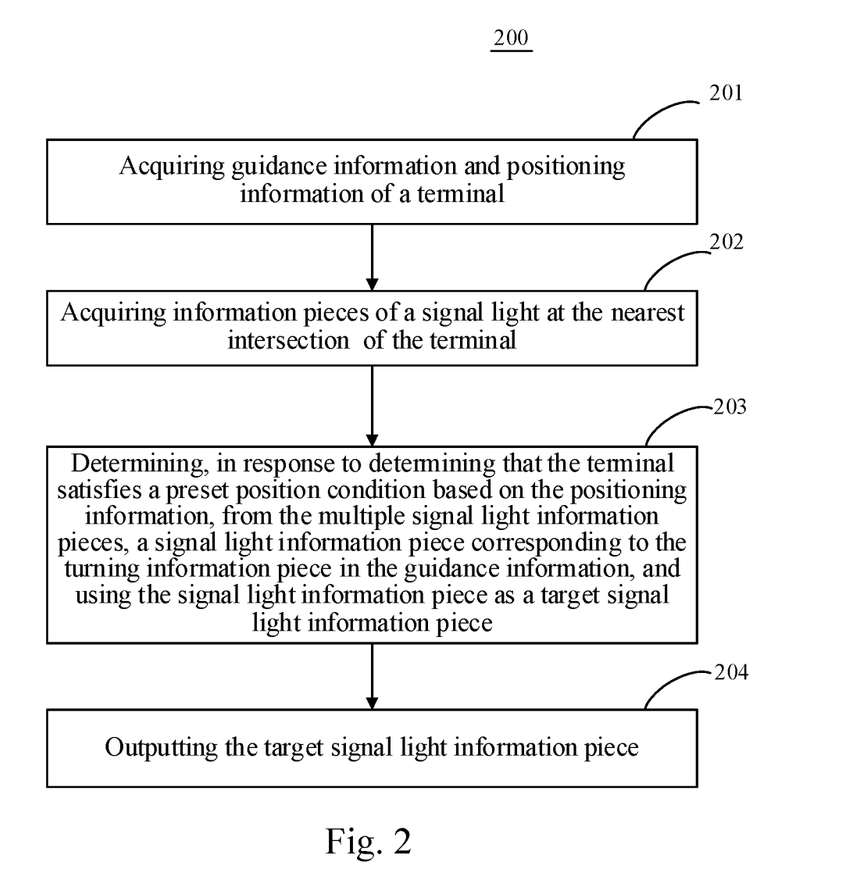
FIG. 2 is a flowchart of an embodiment of a method for outputting signal light information according to the present disclosure.

Further referring to FIG. 2, a flow 200 of an embodiment of the method for outputting signal light information according to the present disclosure is shown, and the method for outputting signal light information includes steps 201 to 204.

Step 201 includes acquiring guidance information and positioning information of a terminal, where the guidance information includes a turning information piece of a turning at a nearest intersection along a traveling direction of the terminal.

In this embodiment, an execution body that executes the method for outputting signal light information (such as the terminal devices or the server shown in FIG. 1) may acquire the guidance information and the positioning information of the terminal. Specifically, the guidance information includes the turning information piece of the turning at the nearest intersection along the traveling direction of the terminal, i.e., in a navigation, the type of turning to be used by the terminal at the nearest intersection. The turning information piece herein may include at least one of turning left, turning right, going straight or turning around.

In practice, specific turning information pieces may include multiple types, such as turning left and moving to the right, and turning left and moving to the left. The execution body or other electronic devices may put specific turning information pieces of the same turning direction into one category. For example, the above two information pieces may be putted into one category of turning left, thereby obtaining the turning information piece in the guidance information.

Step 202 includes acquiring information pieces of a signal light at the nearest intersection of the terminal, where the information pieces of the signal light include multiple signal light information pieces corresponding to respective turning information pieces.

In this embodiment, the execution body may acquire the information pieces of the signal light at the nearest intersection of the terminal. Specifically, the execution body may acquire the information pieces of the signal light from a cloud server, or may acquire the information pieces of the signal light from a signal light terminal at the nearest intersection. The signal light is a light arranged at an intersection to instruct a vehicle to step or pass, and may be, for example, a traffic light.

The signal light information pieces, i.e., the multiple signal light information pieces, corresponding to the multiple turning information pieces respectively, are acquired. Each signal light information piece corresponds to one turning information piece. For example, a signal light information piece may be a signal light information piece corresponding to turning left.

Step 203 includes determining, in response to determining that the terminal satisfies a preset position condition based on the positioning information, from the multiple signal light information pieces, a signal light information piece corresponding to the turning information piece in the guidance information, and using the signal light information piece as a target signal light information piece.

In this embodiment, when it is determined that the terminal satisfies the preset position condition based on the positioning information, the execution body may determine, from the multiple signal light information pieces, the signal light information piece corresponding to the turning information piece in the guidance information, and use the signal light information piece as the target signal light information piece. Specifically, the execution body may use only the signal light information piece to be used by the terminal, i.e., the signal light information piece corresponding to the turning information piece, as the target signal light information piece. For example, if the turning information piece in the guidance information of the terminal indicates that the terminal will go straight, the signal light information piece corresponding to the turning information piece is the target signal light information piece. For signal light information pieces other than the target signal light information piece among the acquired multiple signal light information pieces, the execution body may not perform processing on these signal light information pieces.

Step 204 includes outputting the target signal light information piece.

In this embodiment, the execution body may output the target signal light information piece. For example, the execution body may display the target signal light information piece, or the execution body may send the target signal light information piece to another electronic device.

According to the method provided by the embodiments of the present disclosure, for a direction in which the traveling will be, the signal light information piece of the direction is displayed, thereby avoiding the problems of insufficient clarity and intuitiveness caused by displaying the signal light information pieces of multiple directions at the same time.

In some alternative implementations of this embodiment, the preset position condition is that the terminal is within a fence range of the nearest intersection, and the fence range includes a fence radius centered at a center of the intersection, and the positioning information includes a current distance between the terminal and the center of the intersection; and the determining that the terminal satisfies the preset position condition based on the positioning information, may include: determining a magnitude relationship between the current distance and the fence radius; and determining, if it is determined that the magnitude relationship is that the current distance is smaller than or equal to the fence radius, that the terminal satisfies the preset position condition.

In these alternative implementations, the execution body may use the current distance between the terminal and the center of the intersection as the positioning information, and compare the magnitudes of the current distance and the fence radius. Specifically, the execution body may compare the magnitudes in various ways. For example, the execution body may determine whether the current distance is smaller than or equal to the fence radius. If the determination result is that the current distance is smaller than or equal to the fence radius, the execution body may determine that the terminal satisfies the preset position condition.

These implementations may accurately determine whether the terminal satisfies the preset position condition through the fence radius.

In some alternative implementations of this embodiment, the step 203 may include: updating, in response to determining that the terminal satisfies the preset position condition based on the positioning information, a current direction information piece of the terminal with the turning information piece in the guidance information; and determining, from the multiple signal light information pieces, the signal light information piece corresponding to the updated current direction information piece as the target signal light information piece.

In these alternative implementations, the execution body may update the current direction information piece when the terminal is close to the intersection. That is, the turning information piece in the guidance information is determined as the current direction information piece of the terminal, i.e., a local direction value. Then, the execution body may determine the signal light information piece corresponding to the updated current direction information piece from the multiple signal light information pieces, and use the signal light information piece as the target signal light information piece.

These implementations can update the direction of the terminal when the terminal is close to the intersection, thereby finding a good timing for determining the direction, and avoiding an inaccurate direction caused by determining the direction too early or a too short time period for displaying the signal light information piece to the user caused by determining the direction too late.

In some alternative implementations of this embodiment, the step 203 may include: updating, in response to determining that the terminal does not satisfy the preset position condition based on the positioning information, a current direction information piece of the terminal with an information piece indicating going straight; and determining, from the multiple signal light information pieces, a signal light information piece corresponding to the updated current direction information piece as the target signal light information piece.

In these alternative implementations, when it is determined that the terminal does not satisfy the preset position condition based on the positioning information, the execution body may update the current direction information piece of the terminal with the information piece indicating going straight, and the updated current direction information piece is the information piece indicating going straight. Then, the execution body may determine, from the multiple signal light information pieces, the signal light information piece corresponding to the updated current direction information piece, and use the signal light information piece as the target signal light information piece.

In these implementations, when the terminal is far from the intersection, the direction of the terminal is set to continue driving, i.e., going straight, thereby avoiding determining the direction of the turning at the intersection too early, which results in that a direction changing on the way to the intersection causes the inconsistence between the displayed signal light information piece and the signal light information piece that the user needs to refer to.

Figure 3:
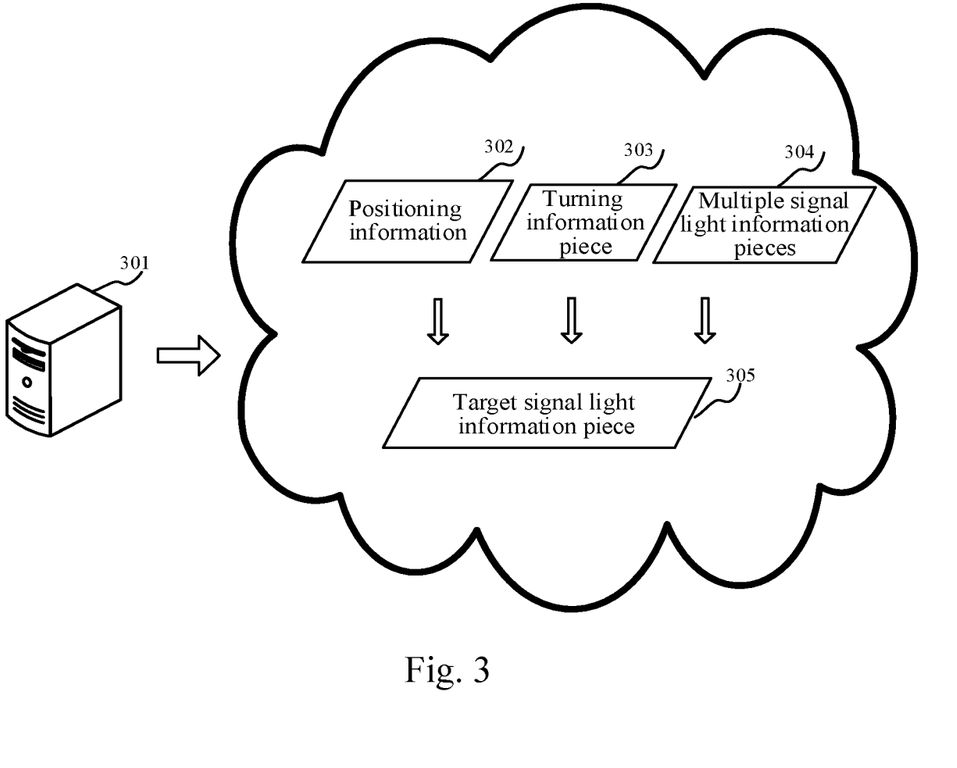
FIG. 3 is a schematic diagram of an application scenario of the method for outputting signal light information according to the present disclosure.

Further referring to FIG. 3, FIG. 3 is a schematic diagram of an application scenario of the method for outputting signal light information according to this embodiment. In the application scenario of FIG. 3, an execution body 301 acquires the guidance information of a terminal, where the guidance information includes positioning information 302 of the terminal and a turning information piece 303 of a turning at a nearest intersection of the terminal in the traveling direction, such as turning left. The execution body 301 acquires signal light information pieces 304 of a signal light at the nearest intersection of the terminal, where the information pieces of the signal light include multiple signal light information pieces corresponding to multiple turning information pieces respectively. In response to determining that the terminal satisfies a preset position condition based on the positioning information 302, the execution body 301 determines, from the multiple signal light information pieces 304, a signal light information piece corresponding to the turning information piece 303 in the guidance information, and uses the signal light information piece as a target signal light information piece 305. The execution body 301 outputs the target signal light information piece 305.

Figure 4:
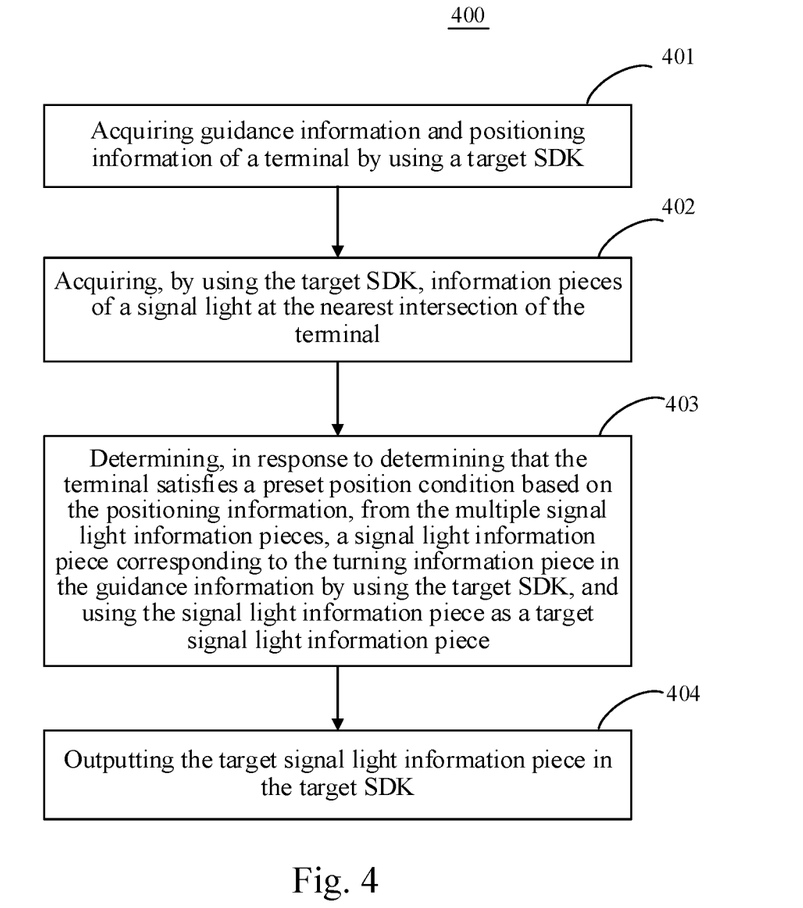
FIG. 4 is a flowchart of another embodiment of the method for outputting signal light information according to the present disclosure.

Further referring to FIG. 4, a flow 400 of another embodiment of the method for outputting signal light information is shown. The method may be applied to the terminal, and the terminal runs a target SDK (software development kit). The flow 400 may be performed by using the target SDK, and may include steps 401 to 404.

Step 401 includes acquiring guidance information of a terminal by using a target SDK, where the guidance information includes a turning information piece of a turning at a nearest intersection along a traveling direction of the terminal.

In this embodiment, an execution body that executes the method for outputting signal light information (such as the terminal devices and the server shown in FIG. 1) may acquire the guidance information and positioning information of the terminal by using the target SDK. Specifically, the guidance information may include the turning information piece of turning at the nearest intersection along the traveling direction of the terminal, i.e., in a navigation, the type of turning to be used by the terminal at the nearest intersection. The turning information piece herein may include at least one of turning left, turning right, going straight or turning around.

The target SDK may be an SDK for processing and outputting signal lamp information pieces on the terminal, i.e., an SDK of traffic light data.

Step 402 includes acquiring, by using the target SDK, information pieces of a signal light at the nearest intersection of the terminal, where the information pieces of the signal light include multiple signal light information pieces corresponding to multiple turning information pieces respectively.

In this embodiment, the execution body may acquire, by using the target SDK, the information pieces of the signal light at the nearest intersection of the terminal. Specifically, the execution body may acquire the information pieces of the signal light from a cloud server, or may acquire the information pieces of the signal light from a signal light terminal at the nearest intersection.

Step 403 includes determining, in response to determining that the terminal satisfies a preset position condition based on the positioning information, from the multiple signal light information pieces, a signal light information piece corresponding to the turning information piece in the guidance information by using the target SDK, and using the signal light information piece as a target signal light information piece.

In this embodiment, when it is determined that the terminal satisfies the preset position condition based on the positioning information, the execution body may determine, from the multiple signal light information pieces, the signal light information piece corresponding to the turning information piece in the guidance information by using the target SDK, and use the signal light information piece as the target signal light information piece. Specifically, the execution body may use only the signal light information piece to be used by the terminal as the target signal light information. For example, if the turning information piece in the guidance information of the terminal indicates going straight, the signal light information piece to be used is a signal light information piece corresponding to the turning information piece. For signal light information pieces other than the target signal light information piece among the acquired multiple signal light information pieces, the execution body may not perform processing on these signal light information pieces.

Step 404 includes outputting the target signal light information piece from the target SDK.

In this embodiment, the execution body may output the target signal light information piece from the target SDK. For example, the execution body may display the target signal light information piece, or the execution body may send the target signal light information piece from the target SDK to another electronic device.

Alternatively, the preset position condition is that the terminal is within a fence range of the nearest intersection, and the fence range includes a fence radius centered at a center of the intersection, and the positioning information includes a current distance between the terminal and the center of the intersection. The execution body may determine a magnitude relationship between the current distance and the fence radius by using the target SDK, and if it is determined that the magnitude relationship is that the current distance is smaller than or equal to the fence radius, the execution body determines that the terminal satisfies the preset position condition.

In this embodiment, the target SDK can be used to process the signal light information pieces, thereby improving the accuracy of the output target signal light information piece.

In some alternative implementations of this embodiment, a navigation application is installed in the terminal, and the method further includes: acquiring the guidance information and the positioning information in the navigation application; and the acquiring guidance information and positioning information of a terminal, includes: receiving by the target SDK the guidance information and the positioning information output from the navigation application; and the outputting the target signal light information piece, includes: outputting the target signal light information piece from the target SDK to the navigation application, and displaying the target signal light information piece in the navigation application.

In these alternative implementations, the execution body may acquire the guidance information and the positioning information in the navigation application and output the guidance information and the positioning information to the target SDK, so that the target SDK acquires the guidance information and the positioning information of the terminal. Then, the execution body may output the target signal light information piece from the target SDK to the navigation application, and displaying the target signal light information piece to the user in the navigation application.

In these implementations, the terminal can interact between the navigation application and the target SDK, thereby achieving the generation and display of the target signal light information piece.

Figure 5:
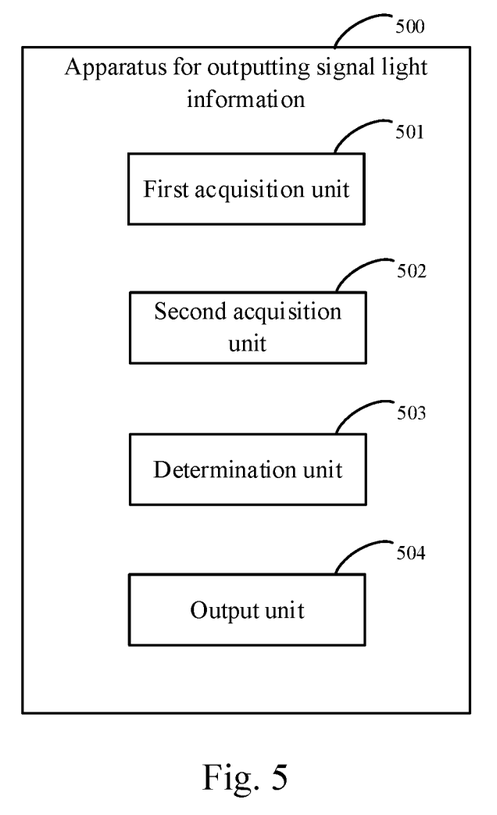
FIG. 5 is a schematic structural diagram of an embodiment of an apparatus for outputting signal light information according to the present disclosure.

Further referring to FIG. 5, as an implementation of the method shown in above figures, the present disclosure provides an embodiment of an apparatus for outputting signal light information. The embodiment of the apparatus corresponds to the embodiment of the method shown in FIG. 2. In addition to the features described below, the embodiment of the apparatus may alternatively include the same or corresponding features or effects as the embodiment of the method shown in FIG. 2. The apparatus is particularly applicable to various electronic devices.

As shown in FIG. 5, the apparatus 500 for outputting signal light information of this embodiment includes: a first acquisition unit 501, a second acquisition unit 502, a determination unit 503 and an output unit 504. The first acquisition unit 501 is configured to acquire guidance information and positioning information of a terminal, where the guidance information includes a turning information piece of a turning at a nearest intersection along a traveling direction of the terminal; the second acquisition unit 502 is configured to acquire information pieces of a signal light at the nearest intersection of the terminal, where the information pieces include of the signal light include multiple signal light information pieces corresponding to multiple turning information pieces respectively; the determination unit 503 is configured to determine, in response to determining that the terminal satisfies a preset position condition based on the positioning information, from the multiple signal light information pieces, a signal light information piece corresponding to the turning information piece in the guidance information, and use the signal light information piece as a target signal light information piece; and the output unit 504 is configured to outputting the target signal light information piece.

In this embodiment, the specific processing of the first acquisition unit 501, the second acquisition unit 502, the determination unit 503 and the output unit 504 of the apparatus 500 for outputting signal light information and the technical effects thereof may be described with reference to the related description of steps 201 to 204 in the embodiment corresponding to FIG. 2, and are thus not repeated herein.

In some alternative implementations of this embodiment, the preset position condition is that the terminal is within a fence range of the nearest intersection, and the fence range includes a fence radius centered at a center of the intersection, and the positioning information includes a current distance between the terminal and the center of the intersection; and the determination unit is further configured to determine that the terminal satisfies the preset position condition based on the positioning information by: determining a magnitude relationship between the current distance and the fence radius; and determining, if it is determined that the magnitude relationship is that the current distance is smaller than or equal to the fence radius, that the terminal satisfies the preset position condition.

In some alternative implementations of this embodiment, the apparatus is applied in the terminal, the terminal runs a target SDK, and the terminal implements the function of the apparatus by using the target SDK.

In some alternative implementations of this embodiment, a navigation application is installed in the terminal; and the apparatus further includes: a third acquisition unit configured to acquire the guidance information and the positioning information in the navigation application; and the first acquisition unit is further configured to acquire guidance information and positioning information of a terminal by: receiving by the target SDK the guidance information and the positioning information output from the navigation application; and the output unit is further configured to output the target signal light information piece by: outputting the target signal light information piece from the target SDK to the navigation application, and displaying the target signal light information piece in the navigation application.

In some alternative implementations of this embodiment, the determination unit is further configured to determine, in response to determining that the terminal satisfies the preset position condition based on the positioning information, from the multiple signal light information pieces, a signal light information piece corresponding to the turning information piece in the guidance information, and using the signal light information piece as the target signal light information piece by: updating, in response to determining that the terminal satisfies the preset position condition based on the positioning information, a current direction information piece of the terminal with the turning information piece in the guidance information; and determining, from the multiple signal light information pieces, the signal light information piece corresponding to an updated current direction information piece as the target signal light information piece.

In some alternative implementations of this embodiment, the apparatus further includes: an updating unit configured to update, in response to determining that the terminal does not satisfy the preset position condition based on the positioning information, a current direction information piece of the terminal with an information piece indicating going straight; and a target determination unit configured to determine, from the multiple signal light information pieces, a signal light information piece corresponding to the updated current direction information piece as the target signal light information piece.

According to an embodiment of the present disclosure, the present disclosure further provides an electronic device and a readable storage medium.

Figure 6:
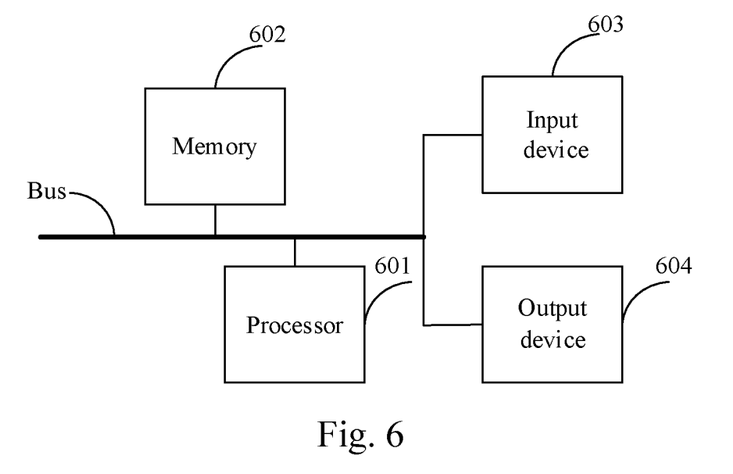
FIG. 6 is a block diagram of an electronic device adapted to implement the method for outputting signal light information according to an embodiment of the present disclosure.

FIG. 6 is a block diagram of an electronic device adapted to implement the method for outputting signal light information according to an embodiment of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 6, the electronic device includes one or more processors 601, a memory 602 and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected (for example, used as a server array, a set of blade servers or a multiprocessor system), and the electronic device provides some of the necessary operations. An example of a processor 601 is shown in FIG. 6.

The memory 602 is a non-transitory computer readable storage medium according to the present disclosure. The memory stores instructions executable by at least one processor to cause the at least one processor to execute the method for outputting signal light information according to the present disclosure. The non-transitory computer readable storage medium of the present disclosure stores computer instructions for causing a computer to execute the method for outputting signal light information according to the present disclosure.

As a non-transitory computer readable storage medium, the memory 602 may be used to store non-transitory software programs, non-transitory computer executable programs and modules, such as the program instructions or modules corresponding to the method for outputting signal light information in the embodiment of the present disclosure (for example, the first acquisition unit 501, the second acquisition unit 502, the determination unit 503 and the output unit 504 shown in FIG. 5). The processor 601 runs the non-transitory software programs, instructions and modules stored in the memory 602 to execute various functional applications and data processing of the server, thereby implementing the method for outputting signal light information in the embodiment of the method.

The memory 602 may include a storage program area and a storage data area, where the storage program area may store an operating system and an application program required by at least one function; and the storage data area may store data created by the electronic device when executing the method for outputting signal light information. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for outputting signal light information. Examples of such networks include, but are not limited to, the Internet, enterprise intranets, local area networks, mobile communication networks and combinations thereof.

The electronic device adapted to execute the method for outputting signal light information may further include an input device 603 and an output device 604. The processor 601, the memory 602, the input device 603 and the output device 604 may be interconnected through a bus or other means, and an example of a connection through the bus is shown in FIG. 6.

The input device 603 may receive input digit or character information, and generate key signal input related to user settings and functional control of the electronic device adapted to execute the method for outputting signal light information, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), and the Internet.

The computer system may include a client and a server. The client and the server are typically remote from each other and typically interact through a communication network. The relationship between the client and the server is generated by a computer program running on the corresponding computer and having a client-server relationship with each other. The server may be a cloud server, also known as a cloud computing server or a cloud host, which is a host product in the cloud computing service system and may solve the defects of difficult management and weak service scalability existing in a conventional physical host and a VPS (Virtual Private Server) service. The server may alternatively be a serve of a distributed system, or a server combined with a blockchain.

The flowcharts and block diagrams in the accompanying drawings show architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, including a first acquisition unit, a second acquisition unit, a determination unit and an output unit, where the names of these units do not in some cases constitute a limitation to such units themselves. For example, the first acquisition unit may alternatively be described as "a guidance information unit".

In another aspect, the present disclosure further provides a computer readable storage medium. The computer readable storage medium may be a computer readable storage medium included in the apparatus described in the previous embodiments, or a stand-alone computer readable storage medium not assembled into the apparatus. The computer readable storage medium stores one or more programs. The one or more programs, when executed by one or more processors, cause the one or more processor to: acquire guidance information and positioning information of a terminal, where the guidance information includes a turning information piece of a turning at a nearest intersection along a traveling direction of the terminal; acquire signal light information pieces of a signal light at the nearest intersection, where the signal light information pieces include multiple signal light information pieces corresponding to multiple turning information pieces respectively; determine, in response to determining that the terminal satisfies a preset position condition based on the positioning information, from the multiple signal light information pieces, a signal light information piece corresponding to the turning information piece in the guidance information, and use the signal light information piece as a target signal light information piece; and output the target signal light information piece.

The above description only provides an explanation of the preferred embodiments of the present disclosure and the technical principles used. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the present disclosure, such as technical solutions formed through the above features and technical features having similar functions provided (or not provided) in the present disclosure being replaced with each other.

What is claimed is:

1. A method for outputting signal light information, the method comprising:
    acquiring guidance information and positioning information of a terminal, wherein the guidance information comprises a turning information piece of a turning at a nearest intersection along a traveling direction of the terminal;
    acquiring information pieces of a signal light at the nearest intersection, wherein the information pieces of the signal light comprise a plurality of signal light information pieces corresponding to a plurality of turning information pieces respectively;
    determining, in response to determining that the terminal satisfies a preset position condition based on the positioning information, from the plurality of the signal light information pieces, a signal light information piece corresponding to the turning information piece in the guidance information, and using the signal light information piece as a target signal light information piece; and
    outputting the target signal light information piece.

2. The method according to claim 1, wherein the preset position condition is that the terminal is within a fence range of the nearest intersection, and the fence range comprises a fence radius centered at a center of the intersection, and the positioning information comprises a current distance between the terminal and the center of the intersection; and the determining that the terminal satisfies a preset position condition based on the positioning information, comprises:
    determining a magnitude relationship between the current distance and the fence radius; and
    determining that the terminal satisfies the preset position condition, in response to determining that the magnitude relationship is that the current distance is smaller than or equal to the fence radius.

3. The method according to claim 1, wherein the method is applied in the terminal, the terminal runs a target SDK (software development kit), and the terminal performs the method by using the target SDK.

4. The method according to claim 3, wherein a navigation application is installed in the terminal; and the method further comprises:
    acquiring the guidance information and the positioning information in the navigation application; and
    the acquiring guidance information and positioning information of a terminal, comprises:
    receiving the guidance information and the positioning information output from the navigation application in the target SDK; and
    the outputting the target signal light information piece, comprises:
    outputting the target signal light information piece from the target SDK to the navigation application, and displaying the target signal light information piece in the navigation application.

5. The method according to claim 1, wherein the determining, in response to determining that the terminal satisfies a preset position condition based on the positioning information, from the plurality of the signal light information pieces, a signal light information piece corresponding to the turning information piece in the guidance information, and using the signal light information piece as a target signal light information piece, comprises:
    updating, in response to determining that the terminal satisfies the preset position condition based on the positioning information, a current direction information piece of the terminal with the turning information piece in the guidance information; and
    determining, from the plurality of the signal light information pieces, the signal light information piece corresponding to the updated current direction information piece as the target signal light information piece.

6. The method according to claim 1, wherein the method further comprises:
    updating, in response to determining that the terminal does not satisfy the preset position condition based on the positioning information, a current direction information piece of the terminal with an information piece indicating going straight; and
    determining, from the plurality of the signal light information pieces, a signal light information piece corresponding to the updated current direction information piece as the target signal light information piece.

7. An electronic device, comprising:
    one or more processors; and
    a storage apparatus for storing one or more programs, wherein the one or more programs, when executed by the one or more processors, cause the one or more processors to perform operations comprising:
    acquiring guidance information and positioning information of a terminal, wherein the guidance information comprises a turning information piece of a turning at a nearest intersection along a traveling direction of the terminal;

acquiring information pieces of a signal light at the nearest intersection, wherein the information pieces of the signal light comprise a plurality of signal light information pieces corresponding to a plurality of turning information pieces respectively;

determining, in response to determining that the terminal satisfies a preset position condition based on the positioning information, from the plurality of the signal light information pieces, a signal light information piece corresponding to the turning information piece in the guidance information, and using the signal light information piece as a target signal light information piece; and outputting the target signal light information piece.

8. The electronic device according to claim 7, wherein the preset position condition is that the terminal is within a fence range of the nearest intersection, and the fence range comprises a fence radius centered at a center of the intersection, and the positioning information comprises a current distance between the terminal and the center of the intersection; and the determining that the terminal satisfies a preset position condition based on the positioning information, comprises:

determining a magnitude relationship between the current distance and the fence radius; and determining that the terminal satisfies the preset position condition, in response to determining that the magnitude relationship is that the current distance is smaller than or equal to the fence radius.

9. The electronic device according to claim 7, wherein the operations are applied in the terminal, the terminal runs a target SDK (software development kit), and the terminal performs the operations by using the target SDK.

10. The electronic device according to claim 9, wherein a navigation application is installed in the terminal; and the operations further comprise:

acquiring the guidance information and the positioning information in the navigation application; and the acquiring guidance information and positioning information of a terminal, comprises:

receiving the guidance information and the positioning information output from the navigation application in the target SDK; and the outputting the target signal light information piece, comprises:

outputting the target signal light information piece from the target SDK to the navigation application, and displaying the target signal light information piece in the navigation application.

11. The electronic device according to claim 7, wherein the determining, in response to determining that the terminal satisfies a preset position condition based on the positioning information, from the plurality of the signal light information pieces, a signal light information piece corresponding to the turning information piece in the guidance information, and using the signal light information piece as a target signal light information piece, comprises:

updating, in response to determining that the terminal satisfies the preset position condition based on the positioning information, a current direction information piece of the terminal with the turning information piece in the guidance information; and determining, from the plurality of the signal light information pieces, the signal light information piece corresponding to the updated current direction information piece as the target signal light information piece.

12. The electronic device according to claim 7, wherein the operations further comprise:

updating, in response to determining that the terminal does not satisfy the preset position condition based on the positioning information, a current direction information piece of the terminal with an information piece indicating going straight; and determining, from the plurality of the signal light information pieces, a signal light information piece corresponding to the updated current direction information piece as the target signal light information piece.

13. A non-transitory computer readable storage medium storing a computer program, wherein the program, when executed by a processor, causes the processor to perform operations comprising:

acquiring guidance information and positioning information of a terminal, wherein the guidance information comprises a turning information piece of a turning at a nearest intersection along a traveling direction of the terminal;

acquiring information pieces of a signal light at the nearest intersection, wherein the information pieces of the signal light comprise a plurality of signal light information pieces corresponding to a plurality of turning information pieces respectively;

determining, in response to determining that the terminal satisfies a preset position condition based on the positioning information, from the plurality of the signal light information pieces, a signal light information piece corresponding to the turning information piece in the guidance information, and using the signal light information piece as a target signal light information piece; and outputting the target signal light information piece.

14. The storage medium according to claim 13, wherein the preset position condition is that the terminal is within a fence range of the nearest intersection, and the fence range comprises a fence radius centered at a center of the intersection, and the positioning information comprises a current distance between the terminal and the center of the intersection; and the determining that the terminal satisfies a preset position condition based on the positioning information, comprises:

determining a magnitude relationship between the current distance and the fence radius; and determining that the terminal satisfies the preset position condition, in response to determining that the magnitude relationship is that the current distance is smaller than or equal to the fence radius.

15. The storage medium according to claim 13, wherein the operations are applied in the terminal, the terminal runs a target SDK (software development kit), and the terminal performs the operations by using the target SDK.

16. The storage medium according to claim 15, wherein a navigation application is installed in the terminal; and the operations further comprise:

acquiring the guidance information and the positioning information in the navigation application; and the acquiring guidance information and positioning information of a terminal, comprises:

receiving the guidance information and the positioning information output from the navigation application in the target SDK; and the outputting the target signal light information piece, comprises:

outputting the target signal light information piece from the target SDK to the navigation application, and displaying the target signal light information piece in the navigation application.

17. The storage medium according to claim 13, wherein the determining, in response to determining that the terminal satisfies a preset position condition based on the positioning information, from the plurality of the signal light information pieces, a signal light information piece corresponding to the turning information piece in the guidance information, and using the signal light information piece as a target signal light information piece, comprises:

updating, in response to determining that the terminal satisfies the preset position condition based on the positioning information, a current direction information piece of the terminal with the turning information piece in the guidance information; and determining, from the plurality of the signal light information pieces, the signal light information piece corresponding to the updated current direction information piece as the target signal light information piece.

18. The storage medium according to claim 13, wherein the operations further comprise:

updating, in response to determining that the terminal does not satisfy the preset position condition based on the positioning information, a current direction information piece of the terminal with an information piece indicating going straight; and determining, from the plurality of the signal light information pieces, a signal light information piece corresponding to the updated current direction information piece as the target signal light information piece.

* * * * *